US012653094B2

(12) United States Patent　　　　(10) Patent No.: US 12,653,094 B2
Thomas et al.　　　　　　　　　　　(45) Date of Patent:　　　Jun. 16, 2026

(54) COVER ASSEMBLY FOR A KNIFE DRIVE OF AN AGRICULTURAL HEADER

(71) Applicant: CNH Industrial America LLC, New Holland, PA (US)

(72) Inventors: Jeffrey D. Thomas, Gordonville, PA (US); Scott P. Deichmann, Phoenixville, PA (US); Joel T. Cook, Akron, PA (US); Brian Patrick Crow, Andalusia, IL (US); Joseph R. Woelfling, Landisville, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 521 days.

(21) Appl. No.: 18/131,084

(22) Filed: Apr. 5, 2023

(65) Prior Publication Data

US 2024/0334868 A1　　　Oct. 10, 2024

(51) Int. Cl.
*A01D 34/40* (2006.01)
*A01D 34/04* (2006.01)
*A01D 34/14* (2006.01)

(52) U.S. Cl.
CPC ............. *A01D 34/40* (2013.01); *A01D 34/04* (2013.01); *A01D 34/145* (2013.01)

(58) Field of Classification Search
CPC ...... A01D 34/04; A01D 34/14; A01D 34/135; A01D 34/16; A01D 34/17; A01D 34/18; A01D 34/22; A01D 34/30; A01D 34/40; A01D 34/145; A01D 41/14
See application file for complete search history.

(56) References Cited

U.S. PATENT DOCUMENTS

| | | | |
|---|---|---|---|
| 7,520,118 B1 | 4/2009 | Priepke | |
| 7,805,919 B2 * | 10/2010 | Priepke | A01D 34/30 |
| | | | 56/257 |
| 8,151,547 B2 | 4/2012 | Bich et al. | |
| 8,341,929 B2 | 1/2013 | Sauerwein et al. | |
| 9,192,097 B2 | 11/2015 | Cook | |
| 9,357,696 B2 | 6/2016 | Ritter et al. | |
| 9,961,828 B2 * | 5/2018 | Cook | A01D 34/04 |
| 10,721,862 B2 | 7/2020 | Bich | |
| 11,259,460 B2 | 3/2022 | Parson et al. | |

(Continued)

FOREIGN PATENT DOCUMENTS

| | | | |
|---|---|---|---|
| WO | 2022067252 | 3/2022 | |
| WO | WO-2022067252 A1 * | 3/2022 | A01D 34/30 |

*Primary Examiner* — Adam J Behrens
(74) *Attorney, Agent, or Firm* — Fletcher Yoder, P.C.

(57)　　　　　ABSTRACT

A cover assembly for a knife drive of an agricultural header includes a cover having a channel configured to receive a drive arm of the knife drive. The channel faces upwardly with respect to a vertical axis of the agricultural header, and a lateral extent of the channel is configured to enable the drive arm to oscillate to drive a blade support of a cutter bar assembly to oscillate. Furthermore, the cover has a front section and a rear section, the front section extends upwardly and rearwardly from a front end of the cover to the rear section, the rear section extends continuously downwardly and rearwardly from the front section to a rear end of the cover, and the rear section is configured to be angled less than 45 degrees relative to a longitudinal belt of the agricultural header.

20 Claims, 6 Drawing Sheets

(56) References Cited

U.S. PATENT DOCUMENTS

| 2014/0109540 A1* | 4/2014 | Cook | ..................... A01D 34/30 |
| | | | 56/320.1 |
| 2014/0345239 A1* | 11/2014 | Cook | ..................... A01D 34/02 |
| | | | 56/299 |
| 2016/0066503 A1* | 3/2016 | Cook | ..................... A01D 41/14 |
| | | | 56/257 |
| 2021/0112716 A1* | 4/2021 | Farley | .................... A01D 41/14 |
| 2022/0000031 A1* | 1/2022 | Kemmerer | ............. A01D 41/14 |
| 2022/0015292 A1* | 1/2022 | Kemmerer | ............. A01D 57/20 |

* cited by examiner

COVER ASSEMBLY FOR A KNIFE DRIVE OF AN AGRICULTURAL HEADER

BACKGROUND

The present disclosure relates generally to a cover assembly for a knife drive of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing agricultural crops from a field, such as by using a header. The header may cut the agricultural crops and transport the resulting crop material to a processing system of the combine.

Certain headers include a cutter bar assembly configured to cut a portion of each crop (e.g., a stalk), thereby separating the crop material from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the crop material to an auger, which moves the crop material toward an inlet of the processing system. Certain headers include a reel assembly configured to direct the crop material from the cutter bar assembly toward the belt(s), thereby substantially reducing the possibility of the crop material falling onto the surface of the field.

The cutter bar assembly may include at least one blade support, a stationary guard assembly, and a moving blade assembly. The moving blade assembly may be fixed to the blade support(s), and the blade support(s)/moving blade assembly may be driven to oscillate relative to the stationary guard assembly. For example, the blade support(s)/moving blade assembly may be driven to oscillate by a knife drive positioned at the lateral center of the header. The knife drive may include one or more drive arms coupled to the blade support(s)/moving blade assembly. The knife drive may also include a driving mechanism configured to drive the drive arm(s) to oscillate, thereby driving the blade support(s)/ moving blade assembly to oscillate. Unfortunately, during operation of the header, crop material may build up on the knife drive (e.g., the driving mechanism of the knife drive), thereby interfering with movement of the crop material from the cutter bar assembly to the belt(s).

SUMMARY

In certain embodiments, a cover assembly for a knife drive of an agricultural header includes a cover having a channel configured to receive a drive arm of the knife drive. The channel faces upwardly with respect to a vertical axis of the agricultural header, and a lateral extent of the channel is configured to enable the drive arm to oscillate to drive a blade support of a cutter bar assembly to oscillate. Furthermore, the cover has a front section and a rear section, the front section extends upwardly and rearwardly from a front end of the cover to the rear section, the rear section extends continuously downwardly and rearwardly from the front section to a rear end of the cover, and the rear section is configured to be angled less than 45 degrees relative to a longitudinal belt of the agricultural header.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
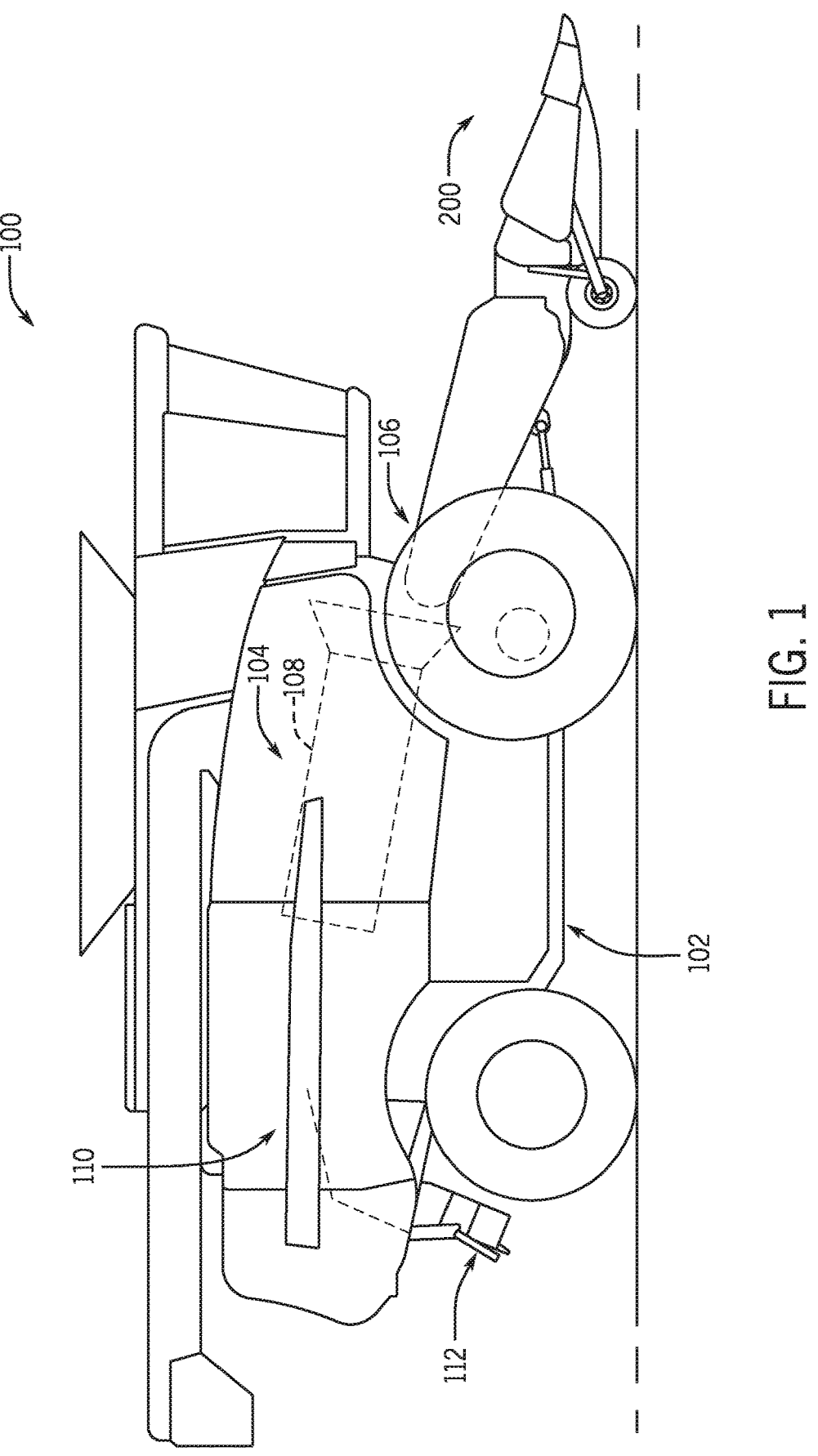
FIG. 1 is a side view of an embodiment of an agricultural harvester having a header.

FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the resulting crop material (e.g., cut crops) toward an inlet 106 of the agricultural crop processing system 104 for further processing of the crop material. The agricultural crop processing system 104 receives the crop material from the header 200 and separates desired crop material from crop residue. For example, the agricultural crop processing system 104 may include a thresher 108 having a cylindrical threshing rotor that transports the crop material in a helical flow path through the harvester 100. In addition to transporting the crop material, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. In certain embodiments, the header 200 also includes a reel assembly configured to urge crop material from the cutter bar assembly to belts that convey the crop material toward the inlet 106 of the agricultural crop processing system 104. Furthermore, in certain embodiments, the header 200 includes an auger positioned downstream from the belts and configured to move the crop material toward the agricultural crop processing system via rotation of the auger. The auger includes a shaft and a flighting extending radially outwardly from the shaft. The auger may be driven to rotate by one or more motors, thereby driving the flighting to rotate. The flighting engages the crop material and moves the crop material toward the agricultural crop processing system.

The cutter bar assembly includes at least one blade support, a stationary guard assembly, and a moving blade assembly. The moving blade assembly is fixed to the blade support(s), and the blade support(s)/moving blade assembly are driven to oscillate relative to the stationary guard assembly. As discussed in detail below, the blade support(s)/moving blade assembly is driven to oscillate by a knife drive positioned at the lateral center of the header. The knife drive includes one or more drive arms coupled to the blade support(s)/moving blade assembly. The knife drive also includes a driving mechanism configured to drive the drive arm(s) to oscillate, thereby driving the blade support(s)/moving blade assembly to oscillate.

In certain embodiments, the header 200 includes a cover assembly for the knife drive. The cover assembly includes a cover configured to cover the driving mechanism. In addition, the cover includes a channel for each drive arm. Each channel faces upwardly with respect to a vertical axis of the agricultural header 200, and a lateral extent of each channel is configured to enable the respective drive arm to oscillate to drive the blade support(s) to oscillate. Furthermore, the cover has a front section and a rear section. The front section extends upwardly and rearwardly from a front end of the cover to the rear section, and the rear section extends continuously downwardly and rearwardly from the front section to a rear end of the cover. The rear section is angled less than 45 degrees relative to a longitudinal belt. The front section and the rear section establish a smooth surface extending along the cover, thereby facilitating flow of the crop material over the driving mechanism of the knife drive. In addition, the small angle between the rear section and the longitudinal belt facilitates movement of the crop material from the cover to the longitudinal belt. As a result, the crop material may flow smoothly from the cutter bar assembly to the longitudinal belt, thereby enhancing the efficiency of the harvesting operation.

Figure 2:
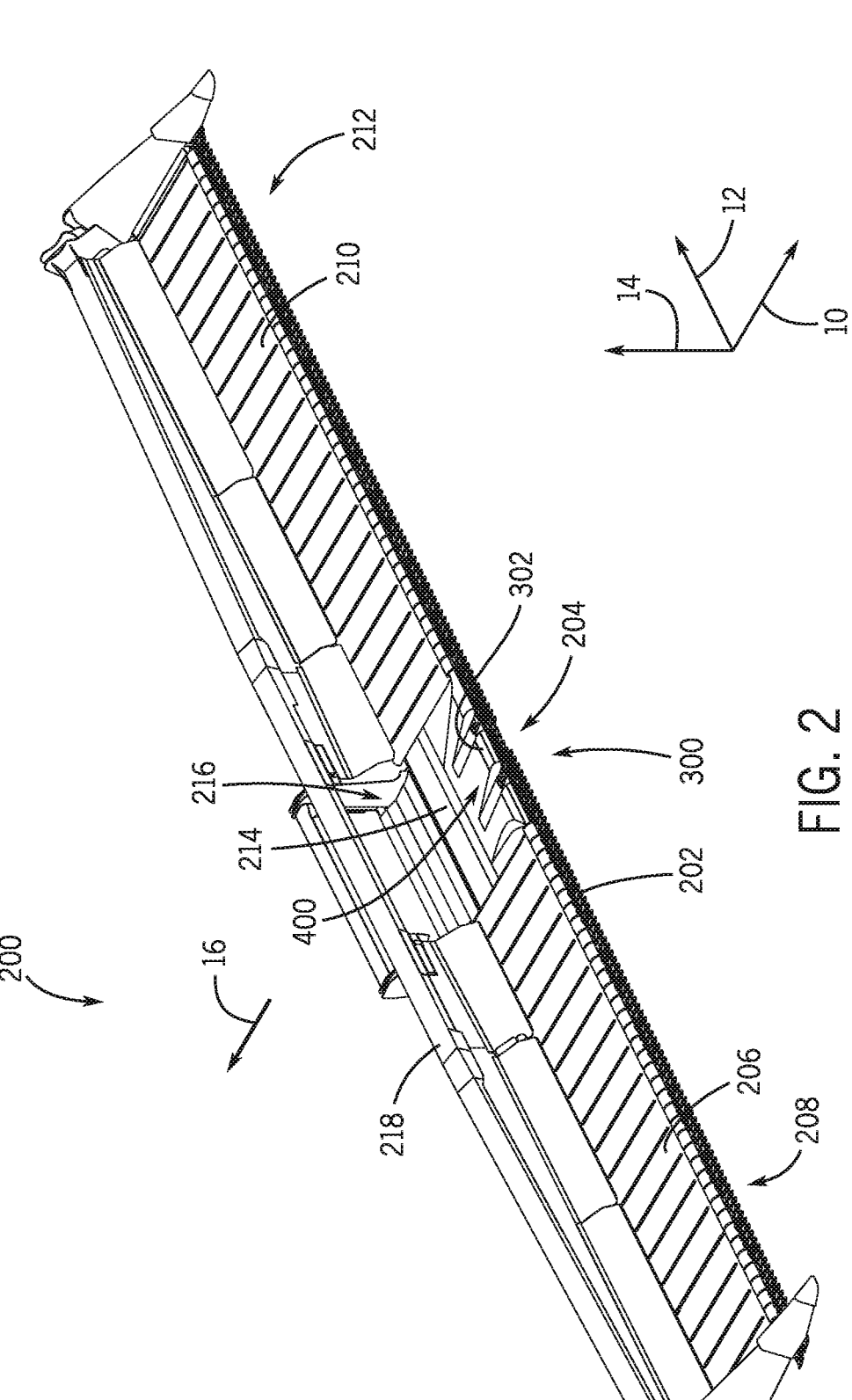
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 with respect to a longitudinal axis 10 of the header 200. As illustrated, the cutter bar assembly 202 extends along a substantial portion of the width of the header 200 (e.g., the extent of the header 200 along a lateral axis 12). The cutter bar assembly includes one or more blade supports, a stationary guard assembly, and a moving blade assembly. The moving blade assembly is fixed to the blade support(s) (e.g., above the blade support(s) with respect to a vertical axis 14 of the header 200), and the blade support(s)/moving blade assembly is driven to oscillate relative to the stationary guard assembly. In the illustrated embodiment, the blade support(s)/moving blade assembly is driven to oscillate by a knife drive 204 positioned at the lateral center of the header 200. The knife drive 204 includes one or more drive arms coupled to the blade support(s)/moving blade assembly. The knife drive 204 also includes a driving mechanism configured to drive the drive arm(s) to oscillate, thereby driving the blade support(s)/moving blade assembly to oscillate. As the harvester moves through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side 208 of the header 200 and a second lateral belt 210 on a second lateral side 212 of the header 200, opposite the first lateral side 208. Each belt is driven to rotate by a suitable drive mechanism, such as an electric motor or a hydraulic motor. The first lateral belt 206 and the second lateral belt 210 are driven such that the top surface of each belt moves laterally inward. In addition, the header 200 includes a longitudinal belt 214 positioned between the first lateral belt 206 and the second lateral belt 210 with respect to the lateral axis 12. The longitudinal belt 214 is driven to rotate by a suitable drive mechanism, such as an electric motor or a hydraulic motor. The longitudinal belt 214 is driven such that the top surface of the longitudinal belt 214 moves rearwardly with respect to the longitudinal axis 10.

In certain embodiments, the crop material (e.g., cut crops) cut by the cutter bar assembly 202 are directed toward the belts by a reel assembly, thereby substantially reducing the possibility of the crop material falling onto the surface of the field. The reel assembly may include a reel having multiple tines. The reel assembly may also include a rotating structure that is driven to rotate (e.g., by one or more electric motors, by one or more hydraulic motors, etc.). Furthermore, the reel may include multiple bat tubes rotatably coupled to the rotating structure, and a respective set of tines may be coupled to each bat tube. The reel assembly may include tine rotation mechanism(s) (e.g., cam and follower assembly/assemblies or parallel state assembly/assemblies). Each tine rotation mechanism is configured to drive the bat tubes to rotate relative to the rotating structure (e.g., in response to rotation of the rotating structure). Accordingly, the tines rotate in a first pattern (e.g., circular pattern) about the rotational axis of the rotating structure and in second patterns (e.g., circular patterns or oscillating patterns) about the rotational axes of respective bat tubes. The tines are configured to engage the crop material and to urge the crop material to move toward the belts. The crop material that contacts the top surface of each lateral belt is driven laterally inwardly to the longitudinal belt due to the movement of the lateral belt. In addition, the crop material that contacts the longitudinal belt 214 and the crop material provided to the longitudinal belt by the lateral belts is driven rearwardly with respect to the longitudinal axis 10 (e.g., along a rearward direction 16) due to the movement of the longitudinal belt 214.

In certain embodiments, the header includes an auger positioned downstream from the belts and configured to move the crop material toward the agricultural crop processing system via rotation of the auger. For example, the auger may be positioned rearward of the longitudinal belt 214 with respect to the longitudinal axis 10 (e.g., along the rearward direction 16) and within an opening 216 of the header 200. Accordingly, the auger may receive the crop material from the longitudinal belt 214 and move the crop material along the rearward direction 16 through the opening 216 and toward the inlet of the agricultural crop processing system.

In the illustrated embodiment, the header 200 includes a cover assembly 300 for the knife drive. The cover assembly includes a cover 302 configured to cover the driving mechanism. In addition, the cover 302 includes a channel for each drive arm. Each channel faces upwardly with respect to the vertical axis 14, and a lateral extent of each channel (e.g., extent of the channel with respect to the lateral axis 12) is configured to enable the respective drive arm to oscillate to drive the blade support(s) to oscillate. Furthermore, the cover has a front section and a rear section. The front section extends upwardly and rearwardly from a front end of the cover to the rear section, and the rear section extends continuously downwardly and rearwardly from the front section to a rear end of the cover. The rear section is angled less than 45 degrees relative to the longitudinal belt 214. The front section and the rear section establish a smooth surface extending along the cover 302, thereby facilitating flow of the crop material over the driving mechanism of the knife drive. In addition, the small angle between the rear section and the longitudinal belt facilitates movement of the crop material from the cover 302 to the longitudinal belt 214. As a result, the crop material may flow smoothly from the cutter bar assembly 202 to the longitudinal belt 214, thereby enhancing the efficiency of the harvesting operation.

Furthermore, in certain embodiments, the header 200 (e.g., the cover assembly 300 of the header 200) includes a latch assembly 400 configured to couple the cover 302 to a frame 218 of the header 200. The latch assembly 400 includes a latch movably coupled to the cover 302, in which the latch has a handle configured to be positioned within a channel of the cover. The latch assembly 400 also includes a receiver coupled to the frame 218 of the header 200, and the latch assembly 400 includes a biasing member configured to urge the latch toward an engaged position. The latch is configured to engage the receiver while in the engaged position to couple the cover 302 to the frame 218. The latch assembly enables the cover 302 to be removed from the frame 218 and attached to the frame 218 without tools, thereby substantially reducing the duration associated with knife drive cleaning/maintenance operations. As a result, the efficiency of the harvesting process may be enhanced.

Figure 3:
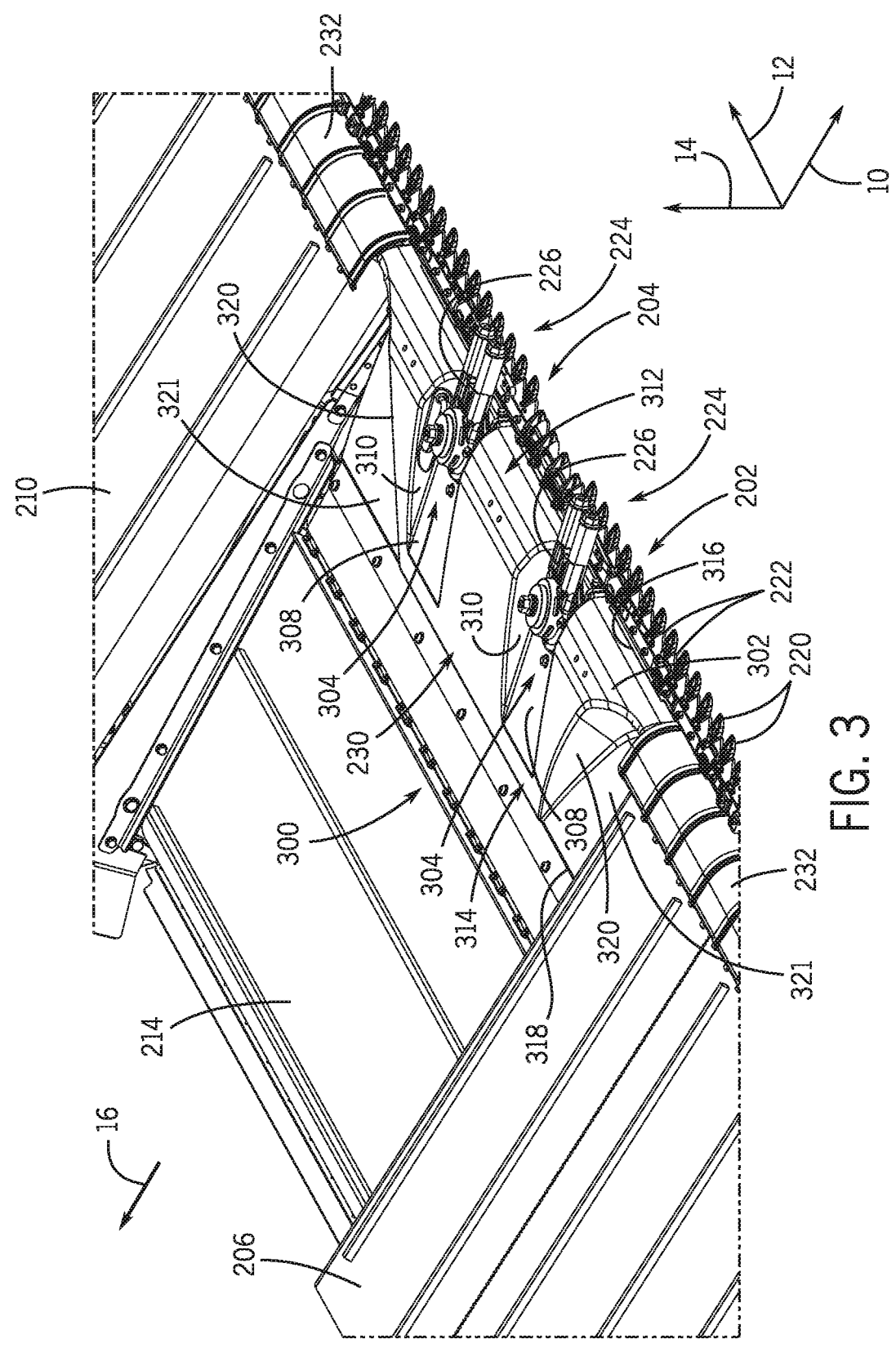
FIG. 3 is a perspective view of an embodiment of a cover assembly that may be employed within the header of FIG. 2.

FIG. 3 is a perspective view of an embodiment of a cover assembly 300 that may be employed within the header of FIG. 2. As previously discussed, the cutter bar assembly 202 includes a stationary blade assembly 220 and a moving blade assembly 222. Furthermore, in the illustrated embodiment, the cutter bar assembly 202 includes two blade supports 224 coupled to the moving blade assembly 222, and each blade support 224 is positioned below the moving blade assembly 222 with respect to the vertical axis 14. A first blade support 224 is coupled to a first drive arm 226 of the knife drive 204 via a first coupling, and a second blade support 224 is coupled to a second drive arm 226 of the knife drive 204 via a second coupling. As previously discussed, the knife drive 204 includes a driving mechanism 230 configured to drive the drive arms 226 to oscillate, thereby driving the disc blade supports 224 and the moving blade assembly 222 to oscillate. As the harvester moves through a field, the cutter bar assembly 202 engages crops within the field, and the moving blade assembly 222 cuts the crops (e.g., the stalks of the crops) in response to engagement of the cutter bar assembly 202 with the crops.

The driving mechanism 230 may include any suitable elements configured to drive the drive arms 226 to oscillate. For example, the drive mechanism 230 may include one or more motors (e.g., electric motor(s), pneumatic motor(s), hydraulic motor(s), etc.) and an oscillation mechanism. The motor(s) may drive wheel(s)/gear(s) to rotate, thereby driving the oscillation mechanism to drive the drive arms 26 to oscillate. While the knife drive 204 includes two drive arms 226 in the illustrated embodiment, in other embodiments, the knife drive may include more or fewer drive arms (e.g., 1, 3, 4, or more).

The cover 302 of the cover assembly 300 is configured to cover the drive mechanism 230, thereby substantially blocking crop material from engaging components of the drive mechanism 230. As a result, the time between cleaning/maintenance operations for the drive mechanism 230 may be increased, thereby increasing availability of the agricultural harvester. The cover 302 may be formed from any suitable material via any suitable manufacturing process. For example, in certain embodiments, the cover may be formed from stainless steel (e.g., to enhance longevity). However, in other embodiments, the cover may be formed from aluminum, a composite material (e.g., fiber glass, carbon fiber, etc.), a polymeric material (e.g., polycarbonate, polyethylene, polyvinylchloride, etc.), a fiber reinforce polymeric material, other suitable material(s), or a combination thereof. Furthermore, the cover may be formed by a stamping process, a machining process, an additive manufacturing process, an injection molding process, or a combination thereof. In addition, the cover may be formed from a single piece of material or from multiple pieces of material coupled to one another (e.g., via a welding process, a fastening process, an adhesion process, etc.).

In the illustrated embodiment, the cover 302 has a first channel 304 and a second channel 304. Each channel 304 is configured to receive a respective drive arm 226. Furthermore, each channel 304 faces upwardly with respect to the vertical axis 14, and a lateral extent of each channel (e.g., extent of the channel with respect to the lateral axis 12) is configured to enable the respective drive arm 226 to oscillate to drive the respective blade support 224 to oscillate. For example, the lateral extent of at least one channel 304 may be 5 percent, 10 percent, 15 percent, 20 percent, 25 percent, 30 percent, 35 percent, 40 percent, 45 percent, or 50 percent greater than a lateral extent of the respective drive arm(s) 226 (e.g., extent of the drive arm(s) with respect to the lateral axis 12).

As illustrated, each channel 304 is formed by a base surface 308 and sidewalls 310 extending upwardly from the base surface 308. The base surface 308 of each channel 304 has a cutout for the respective drive arm 226, thereby enabling the cover 302 to be removed from the frame 218 and coupled to the frame 218 without removing the drive arms 226. Furthermore, the sidewalls 310 of each channel 304 are laterally spaced apart from one another to establish the lateral extent of the channel 304. In the illustrated embodiment, each sidewall 310 is angled laterally outwardly from the respective base surface 308. The laterally outward slope of each sidewall 310 may facilitate passage of the crop material through the respective channel 304. While each sidewall 310 is angled laterally outwardly from the respective base surface 308 in the illustrated embodiment, in other embodiments, at least one sidewall may extent along the vertical axis, and/or at least one sidewall may be angled laterally inwardly from the base surface of the respective channel.

In the illustrated embodiment, the cover 302 has a front section 312 and a rear section 314. The front section 312 extends upwardly (e.g., with respect to the vertical axis 14) and rearwardly (e.g., along the rearward direction 16) from a front end 316 of the cover 302 to the rear section 314. In addition, the rear section 314 extends continuously downwardly (e.g., with respect to the vertical axis 14) and rearwardly (e.g., along the rearward direction 16) from the front section 312 to a rear end 318 of the cover 302. The interface between the front section 312 and the rear section 314 is positioned at the location where the cover 302 transitions from extending upwardly to extending downwardly. Due to the shape of the front section 312 and the rear section 314, the cover 302 forms a hollow space, thereby enabling the cover 302 to cover the driving mechanism 230 of the knife drive 204. As used herein, "continuously" refers to rearward (e.g., longitudinal) extension of a section without an abrupt vertical change in the section. For example, a ratio between the vertical change and the rearward extension (i.e., vertical change/rearward extension) may be less than 1, less than 0.75, less than 0.5, less than 0.25, or less than 0.1 along an entire rearward (e.g., longitudinal) extent of the section. Furthermore, the front end 316 of the cover 302 is the forwardmost part of the cover 302 configured to engage the crop material, and the rear end 318 of the cover 302 is the rearmost part of the cover 302 configured to engage the crop material.

In the illustrated embodiment, the front section 312 is convex and has a shape configured to substantially match a shape of crop deflectors 232 of the header. In addition, in certain embodiments, a height (e.g., extent with respect to the vertical axis 14) of the front section 312 may be equal to a height (e.g., extent with respect to the vertical axis 14) of the crop deflectors 232. The crop deflectors 232 are configured to direct the crop material from the cutter bar assembly 202 to the respective lateral belts. The shape and height of the crop deflectors 232 and the front section 312 of the cover 302 may be particularly selected to enable the reel of the reel assembly to move the crop material from the cutter bar assembly 202 to the belts while providing clearance between the reel and the crop deflectors 232/front section 312. While the front section 312 has the same shape as the crop deflectors 232 in the illustrated embodiment, in other embodiments, the front section of the cover and the crop deflectors may have different shapes. In addition, in certain embodiments, the height of the front section may be different than the height of the crop deflectors. Furthermore, while the front section 312 of the cover 302 is convex in the illustrated embodiment, in other embodiments, the front section may have another suitable shape (e.g., angled, polygonal, elliptical, etc.).

In the illustrated embodiment, the rear section 314 is angled less than 45 degrees relative to the longitudinal belt 214 of the header. For example, the rear section 314 may be oriented at an angle of about 5 degrees to about 45 degrees, about 10 degrees to about 30 degrees, or about 10 degrees to about 20 degrees relative to the longitudinal belt 214. By way of further example, the angle of the rear section 314 relative to the longitudinal belt 214 may be less than 45 degrees, less than 40 degrees, less than 35 degrees, less than 30 degrees, less than 25 degrees, less than 20 degrees, less than 15 degrees, less than 10 degrees, or less than 5 degrees. The front section 312 and the rear section 314 establish a smooth surface extending along the cover 302, thereby facilitating flow of the crop material over the driving mechanism 230 of the knife drive 204. In addition, the small angle between the rear section 314 and the longitudinal belt 214 facilitates movement of the crop material from the cover 302 to the longitudinal belt 214. As a result, the crop material may flow smoothly from the cutter bar assembly 202 to the longitudinal belt 214, thereby enhancing the efficiency of the harvesting operation.

Furthermore, in the illustrated embodiment, a portion of the rear section 314 is positioned behind each channel 304 with respect to the longitudinal axis 10 of the header (e.g., along the rearward direction 16). Accordingly, crop material moving through each channel 304 may contact a respective portion of the rear section 314 rearward of the channel 304, and the respective portion of the rear section 314 may smoothly direct the crop material toward the longitudinal belt 214. While a portion of the rear section 314 is positioned behind each channel 304 in the illustrated embodiment, in other embodiments, at least one channel may extend to the rear end of the cover (e.g., both channels may extend to the rear end of the cover).

In the illustrated embodiment, the cover 302 has a first lateral concave portion 320 configured to direct crop material from the first lateral belt 206 to the longitudinal belt 214. In addition, the cover 302 has a second lateral concave portion 320 configured to direct crop material from the second lateral belt 210 to the longitudinal belt 214. As illustrated, the second lateral concave portion 320 is positioned on an opposite lateral side of the cover 302 (e.g., opposite side with respect to the lateral axis 12) from the first lateral concave portion 320. Due to the concave shape of each lateral concave portion 320, the cover 302 may effectively direct the crop material from the lateral belts to the longitudinal belt 214, thereby substantially reducing accumulation of crop material at the interfaces between the cover 302 and the lateral belts. As a result, the crop material may flow smoothly to the longitudinal belt, thereby enhancing the efficiency of the harvesting operation. In the illustrated embodiment, each lateral concave portion has a curved profile. However, in other embodiments, at least one lateral concave portion may have another suitable profile (e.g., polygonal, etc.). Furthermore, in the illustrated embodiment, a bottom surface 321 adjacent to each lateral concave portion 320 is angled downwardly along the rearward extent of the bottom surface 321 (e.g., extent of the bottom surface 321 along the rearward direction 16), thereby facilitating movement of the crop material from the respective lateral belt to the longitudinal belt. However, in other embodiments, at least one bottom surface may have another suitable orientation.

Figure 4:
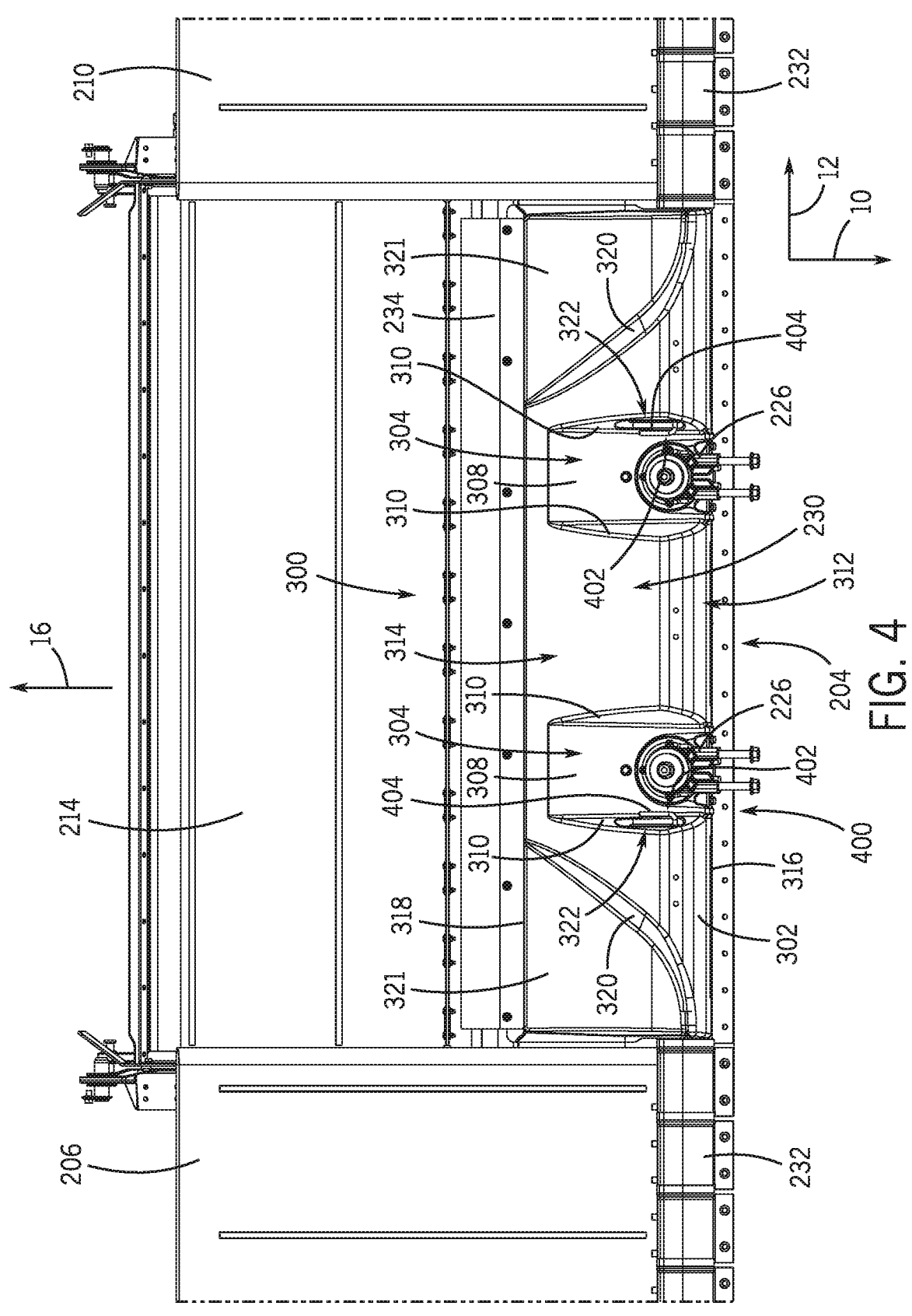
FIG. 4 is a top view of the cover assembly of FIG. 3.

FIG. 4 is a top view of the cover assembly 300 of FIG. 3. As previously discussed, the cover assembly 300 includes the cover 302 configured to cover the driving mechanism 230. In addition, the cover 302 includes a channel 304 for each drive arm 226. Each channel 304 faces upwardly with respect to the vertical axis, and a lateral extent of each channel 304 (e.g., extent of the channel with respect to the lateral axis 12) is configured to enable the respective drive arm 226 to oscillate to drive the respective blade support to oscillate. Furthermore, the cover 302 has the front section 312 and the rear section 314. The front section 312 extends upwardly and rearwardly from the front end 316 of the cover 302 to the rear section 314, and the rear section 314 extends continuously downwardly and rearwardly from the front section 312 to the rear end 318 of the cover 302. The rear section 314 is angled less than 45 degrees relative to the longitudinal belt 214. The front section 312 and the rear section 314 establish a smooth surface extending along the cover 302, thereby facilitating flow of crop material over the driving mechanism 230 of the knife drive 204. In addition, the small angle between the rear section 314 and the longitudinal belt 214 facilitates movement of the crop material from the cover 302 to the longitudinal belt 214. As a result, the crop material may flow smoothly from the cutter bar assembly to the longitudinal belt 214, thereby enhancing the efficiency of the harvesting operation.

Furthermore, the first lateral concave portion 320 is configured to direct the crop material from the first lateral belt 206 to the longitudinal belt 214. In addition, the second lateral concave portion 320 is configured to direct crop material from the second lateral belt 210 to the longitudinal belt 214. The second lateral concave portion 320 is positioned on an opposite lateral side of the cover 302 (e.g., opposite side with respect to the lateral axis 12) from the first lateral concave portion 320. Due to the concave shape of each lateral concave portion 320, the cover 302 may effectively direct the crop material from the lateral belts to the longitudinal belt 214, thereby substantially reducing accumulation of crop material at the interfaces between the cover 302 and the lateral belts.

In the illustrated embodiment, the cover 302 has two channels 304. However, in other embodiments, the cover may have more or fewer channels (e.g., 1, 3, 4, or more). For example, in certain embodiments, the number of channels may be equal to the number of drive arms. Furthermore, in the illustrated embodiment, the cover 302 has two lateral concave portions 320. However, in other embodiments, the cover may include fewer lateral concave portions (e.g., 0, 1). For example, in certain embodiments, the cover may not include any lateral concave portions.

As discussed in detail below, the header includes a latch assembly 400 configured to couple the cover 302 to the frame of the header. In the illustrated embodiment, the latch assembly 400 includes two latches 402, and each latch 402 is movably coupled to the cover 302. Furthermore, each latch 402 has a handle 404 configured to be positioned within a respective channel 304 of the cover 302. The latch assembly 400 also includes respective receivers coupled to the frame of the header, and the latch assembly 400 includes biasing members, in which each biasing member is configured to urge a respective latch 402 toward an engaged position. Each latch 402 is configured to engage a respective receiver while in the engaged position to couple the cover 302 to the frame. The latches 402 enable the cover 302 to be removed from the frame and attached to the frame without tools, thereby substantially reducing the duration associated with knife drive cleaning/maintenance operations. As a result, the efficiency of the harvesting process may be enhanced.

In the illustrated embodiment, each handle 404 is positioned within a respective channel 304 and proximate to a respective sidewall 310 of the cover 302. In addition, a recess 322 is formed within each respective sidewall 310, thereby facilitating access to the handle 404. While a recess 322 is positioned adjacent to each handle 404 in the illustrated embodiment, in other embodiments, at least one recess may be omitted. Furthermore, while each handle 404 is positioned within a respective channel 304 and proximate to a respective sidewall 310 in the illustrated embodiment, in other embodiments, at least one handle may be positioned at another suitable location with respect to the cover (e.g., within a channel and proximate to the base surface, proximate to a lateral concave portion, etc.). In addition, while the latch assembly 400 includes two latches 402 in the illustrated embodiment, in other embodiments, the latch assembly may include more or fewer latches (e.g., 1, 3, 4, or more). Furthermore, in certain embodiments, additional coupling assemblies may be employed to couple the cover to the frame (e.g., in addition to the latch assembly). For example, in certain embodiments, the header may include a clip assembly positioned at the lateral center of the header to enhance the stability/reduce flexing of the cover. The clip assembly may include a clip configured to automatically engage a respective receiver in response to the cover engaging the frame (e.g., in response to the cover reaching a coupled position). In addition, in certain embodiments, the latch assembly may be omitted (e.g., the cover may be coupled to the frame via fastener(s), etc.).

In the illustrated embodiment, the header includes a plate 234 coupled to the frame of the header. The plate 234 is configured to facilitate movement of the crop material from the cover 302 to the longitudinal belt 214. In the illustrated embodiment, the cover 302 has a mounting portion extending rearwardly (e.g., along the rearward direction 16) from the rear end 318 of the cover 302. In addition, the plate 234 forms a recess configured to receive the mounting portion of the cover 302. The recess may be formed between the plate 234 and the frame of the header. Engagement of the mounting portion of the cover 302 with the recess formed by the plate 234 in combination with engagement of the latch(es) 402 with the respective receiver(s) couples the cover 302 to the frame of the header. For example, to couple the cover 302 to the frame of the header, the mounting portion may be engaged with the recess, and the cover may be rotated to drive the latch(es) into engagement with the respective receiver(s). Furthermore, to remove the cover 302 from the frame of the header, the latch(es) may be disengaged from the receiver(s) via actuation of the handle(s) 404 and rotation of the cover 302, and the mounting portion may then be disengaged from the recess. While the cover 302 includes the mounting portion in the illustrated embodiment, in other embodiments, the mounting portion may be omitted (e.g., the cover may be coupled to the frame via the latch assembly alone, the cover may be coupled to the frame via fasters alone, the cover may be coupled to the frame via the latch assembly and fasteners, etc.).

Figure 5:
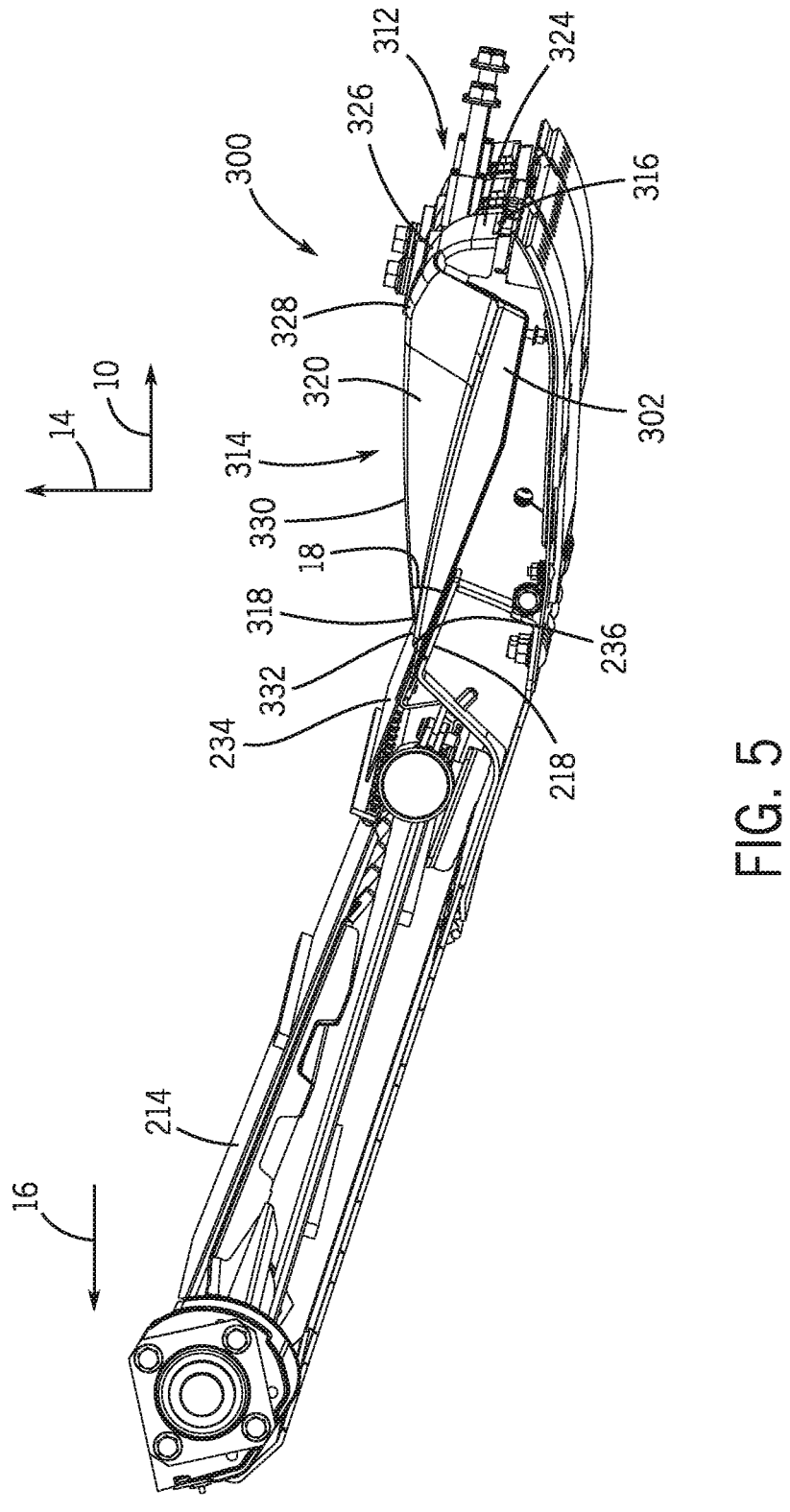
FIG. 5 is a side view of the cover assembly of FIG. 3.

FIG. 5 is a side view of the cover assembly 300 of FIG. 3. As previously discussed, the front section 312 extends upwardly (e.g., with respect to the vertical axis 14) and rearwardly (e.g., along the rearward direction 16) from the front end 316 of the cover 302 to the rear section 314. Furthermore, the front section 312 is convex and has a shape that substantially matches the shape of the crop deflectors. In certain embodiments, a height of the front section 312 may be equal to a height of the crop deflectors. In the illustrated embodiment, the front section 312 has a curved portion 324 and a straight portion 326. As illustrated, the straight portion 326 is positioned rearwardly (e.g., along the rearward direction 16) from the curved portion 324. While the front section 312 has a curved portion and a straight portion positioned rearwardly of the curved portion in the illustrated embodiment, in other embodiments, the front section may have more or fewer portions (e.g., 1, 3, 4, 5, or more), and each portion may have any suitable shape. Furthermore, in certain embodiments, the shape of the front section may be the same along the lateral extent of the cover. However, in other embodiments, the shape of the front section may vary along the lateral extent of the cover.

In addition, as previously discussed, the rear section 314 extends continuously downwardly (e.g., with respect to the vertical axis 14) and rearwardly (e.g., along the rearward direction 16) from the front section 312 to the rear end 318 of the cover 302. As illustrated, the interface 328 between the front section 312 and the rear section 314 is positioned at the location where the cover 302 transitions from extending upwardly to extending downwardly. In the illustrated embodiment, the rear section 314 has a single straight portion 330. However, in other embodiments, the rear section may have additional portions, and each portion (e.g., including the single portion) may have any suitable shape. Furthermore, in certain embodiments, the shape of the rear section may be the same along the lateral extent of the cover. However, in other embodiments, the shape of the rear section may vary along the lateral extent of the cover.

As previously discussed, the rear section 314 (e.g., each portion of the rear section) is angled less than 45 degrees (e.g., about the lateral axis) relative to the longitudinal belt 214 of the header. For example, the rear section 314 may be oriented at an angle 18 of about 5 degrees to about 45 degrees, about 10 degrees to about 30 degrees, or about 10 degrees to about 20 degrees (e.g., about the lateral axis) relative to the longitudinal belt 214. By way of further example, the angle 18 of the rear section 314 relative to the longitudinal belt 214 (e.g., about the lateral axis) may be less than 45 degrees, less than 40 degrees, less than 35 degrees, less than 30 degrees, less than 25 degrees, less than 20 degrees, less than 15 degrees, less than 10 degrees, or less than 5 degrees. The front section 312 and the rear section 314 establish a smooth surface extending along the cover 302, thereby facilitating flow of the crop material over the driving mechanism of the knife drive. In addition, the small angle between the rear section 314 and the longitudinal belt 214 facilitates movement of the crop material from the cover 302 to the longitudinal belt 214. As a result, the crop material may flow smoothly from the cutter bar assembly 202 to the longitudinal belt 214, thereby enhancing the efficiency of the harvesting operation. While the rear section is angled less than 45 degrees relative to the longitudinal belt 214 in the illustrated embodiment, in other embodiments, the angle between the rear section and the longitudinal belt may be greater than or equal to 45 degrees. Furthermore, in embodiments in which the rear section includes multiple portions oriented at different angles and/or one or more curved portions, a line may extent from the interface 328 to the rear end 318, and the angle 18 of the rear section 314 may correspond to the angle of the line relative to the longitudinal belt 214.

In certain embodiments, the cover assembly may include certain features configured to block crop material from passing between the cover and the frame while the cover is in the coupled position (e.g., coupled to the frame), thereby blocking the crop material from engaging components of the drive mechanism. For example, the cover assembly may include a seal extending along at least a portion (e.g., an entirety of) the interface between the cover and the frame. The seal may be formed from any suitable material(s), such as foam, rubber, polymeric material, etc. Furthermore, the seal may be coupled to the cover or the frame (e.g., via an adhesive connection, via a fastener connection, etc.).

As previously discussed, the plate 234 is coupled to the frame 218 of the header. The plate 234 is configured to facilitate movement of the crop material from the cover 302 to the longitudinal belt 214. In the illustrated embodiment, the cover 302 has a mounting portion 332 extending rearwardly (e.g., along the rearward direction 16) from the rear end 318 of the cover 302. In addition, the plate 234 forms a recess 236 configured to receive the mounting portion 332 of the cover 302. The recess 236 is formed between the plate 234 and the frame 218 of the header. Engagement of the mounting portion 332 of the cover 302 with the recess 236 in combination with engagement of the latch(es) with the respective receiver(s) couples the cover 302 to the frame 218 of the header. For example, to couple the cover 302 to the frame 218 of the header, the mounting portion 332 may be engaged with the recess 236 while the latch(es) are positioned above the receiver(s), and the cover 302 may be rotated about the mounting portion 332/recess 236 to drive the latch(es) into engagement with the respective receiver(s). As discussed in detail below, the latch(es) may automatically engage the receiver(s) in response to downward movement of the latch(es) relative to the receiver(s). Furthermore, to remove the cover 302 from the frame 218, the latch(es) may be disengaged from the receiver(s) via actuation of the handle(s) and rotation of the cover 302 about the mounting portion 332/recess 236, and the mounting portion 332 may then be disengaged from the recess 236. While the cover 302 includes the mounting portion in the illustrated embodiment, in other embodiments, the mounting portion may be omitted (e.g., the cover may be coupled to the frame via the latch assembly alone, the cover may be coupled to the frame via fasters alone, the cover may be coupled to the frame via the latch assembly and fasteners, etc.).

Figure 6:
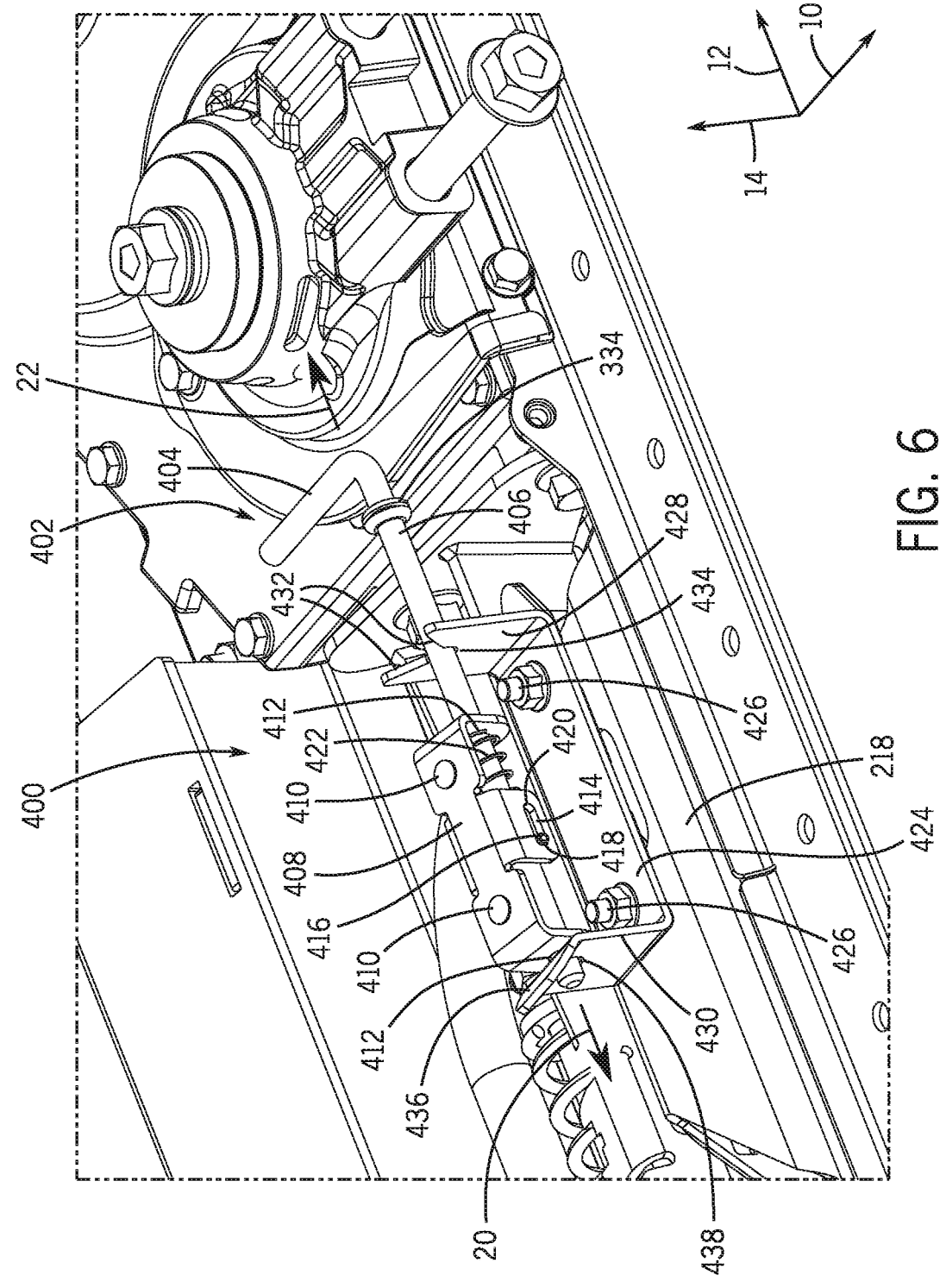
FIG. 6 is a perspective view of an embodiment of a latch assembly that may be employed within the header of FIG. 2 to couple a cover to a frame of the header.

FIG. 6 is a perspective view of an embodiment of a latch assembly 400 that may be employed within the header of FIG. 2 to couple a cover to the frame 218 of the header. As previously discussed, the latch assembly 400 includes one or more latches 402, and each latch 402 is movably coupled to the cover. In the illustrated embodiment, the latch 402 includes a handle 404 and a pin 406 extending from the handle 404. Furthermore, as previously discussed, the handle 404 is positioned within the channel of the cover, thereby providing operator access to the handle 404. In the illustrated embodiment, the handle 404 extends generally parallel to the lateral axis 10, and the pin 406 extends generally parallel to the lateral axis 12. However, in other embodiments, the handle may be oriented at any suitable angle relative to the longitudinal axis, the lateral axis, the vertical axis, or a combination thereof, and/or the pin may be oriented at any suitable angle relative to the longitudinal axis, the lateral axis, the vertical axis, or a combination thereof.

As illustrated, the latch 402 is coupled to the cover by a mount 408. In the illustrated embodiment, the mount 408 is coupled to the cover by a fastener connection, which includes fastener(s) 410 (e.g., rivet(s), screw(s), bolt(s), etc.). However, in other embodiments, the mount may be coupled to the cover by any other suitable type(s) of connection(s) (e.g., alone or in combination with the fastener connection), such as an adhesive connection, a welded connection, a tongue/groove connection, other suitable type(s) of connection(s), or a combination thereof. Furthermore, in the illustrated embodiment, the pin 406 extends through openings 412 in the mount 408 to movably couple the latch 402 to the mount 408, thereby movably coupling the latch 402 to the cover. While the mount 408 has two openings 412 in the illustrated embodiment, in other embodiments, the mount 408 may have more or fewer openings (e.g., 1, 3, 4, or more). The openings 412 enable the pin 406 to move in a first direction 20 and in a second direction 22 relative to the mount 408. In the illustrated embodiment, the cover assembly includes a gromet 334 coupled to the cover. The gromet 334 is configured to block crop material from entering an interior of the cover and engaging components of the drive mechanism, while enabling movement of the pin 406 in the first and second directions. While the cover assembly includes a gromet in the illustrated embodiment, in other embodiments, the gromet may be omitted.

In addition, in the illustrated embodiment, the mount 408 has one or more slots 414, and the pin 406 has one or more corresponding protrusions 416 engaged with the slot(s) 414. Contact between each protrusion 416 and a first end 418 of the respective slot 414 blocks movement of the pin 406 in the first direction 20, and contact between each protrusion 416 and a second end 420 of the respective slot 414 blocks movement of the pin 406 in the second direction 22. Accordingly, the protrusion(s) 416 and the slot(s) 414 control the range of movement of the pin 406 in the first and second directions. Furthermore, engagement of the protrusion(s) 416 with the slot(s) 414 blocks rotation of the latch 402 about an axial axis of the pin 406. As a result, the orientation of the handle 404 about the axial axis of the pin 406 may remain substantially constant. While the range of movement of the pin 406 in the first and second directions is controlled by the protrusion(s)/slot(s) in the illustrated embodiment, in other embodiments, the range of movement of the pin may be controlled by other suitable element(s) (e.g., stop(s), a track assembly, etc.). Furthermore, while rotation of the latch 402 about the axial axis of the pin 406 is blocked by the protrusion(s)/slot(s) in the illustrated embodiment, in other embodiments, rotation of the latch may be blocked by other suitable feature(s) (e.g., a non-circular pin engaging non-circular opening(s) in the mount, a tongue and groove assembly, etc.).

The latch assembly 400 also includes a biasing member 422 configured to urge the latch 402 to move in the first direction 20 toward the illustrated engaged position (e.g., with the protrusion(s) 416 in contact with the first end(s) 418 of the slot(s) 414). Accordingly, while no external force is applied to the latch 402, the latch 402 may remain in the engaged position. In the illustrated embodiment, the biasing member 422 includes one or more coil springs. However, in other embodiments, the biasing member may include other suitable biasing element(s) (e.g., alone or in combination with the coil spring(s)), such as leaf spring(s), resilient member(s), pneumatic cylinder(s), hydraulic cylinder(s), other suitable biasing element(s), or a combination thereof. Furthermore, the biasing member 422 may contact the mount 408 and an element of the pin 406 (e.g., a washer, the protrusion(s), etc.) to urge the latch 402 to move in the first direction 20 toward the engaged position.

In the illustrated embodiment, the latch assembly 400 includes receiver(s) 424 coupled to the frame 218 of the header (e.g., one receiver for each letch). In the illustrated embodiment, the receiver 424 is coupled to the frame 218 by a fastener connection, which includes fastener(s) 426 (e.g., rivet(s), screw(s), bolt(s), etc.). However, in other embodiments, the receiver may be coupled to the frame by any other suitable type(s) of connection(s) (e.g., alone or in combination with the fastener connection), such as an adhesive connection, a welded connection, a tongue/groove connection, other suitable type(s) of connection(s), or a combination thereof.

In the illustrated embodiment, the receiver 424 includes a first engagement portion 428 and a second engagement portion 430. The first engagement portion 428 has guides 432 configured to guide the pin 406 into a recess 434 within the first engagement portion 428 as the cover rotates toward a coupled position, in which the cover is coupled to the frame. The first engagement portion 428 is configured to support the pin 406 (e.g., with respect to the vertical axis 14) and to block movement of the pin 406 in certain directions crosswise to the first and second directions (e.g., directions along the longitudinal axis 10) while the pin 406 is disposed within the recess 434 (e.g., while the cover is in the coupled position). Furthermore, the second engagement portion 430 includes a ramp 436 and an aperture 438. The aperture 438 is configured to receive the pin 406 while the cover is in the coupled position and the latch 402 is in the illustrated engaged position. With the pin 406 disposed within the aperture 438, the second engagement portion 430 of the receiver 424 blocks movement of the pin 406 in directions crosswise to the first and second direction (e.g., directions along the longitudinal axis 10 and directions along the vertical axis 14). Accordingly, with the pin 406 disposed within the aperture 438, the latch 402 is engaged with the receiver 424, thereby coupling the cover to the frame 218 of the header. In addition, the ramp 436 is configured to drive the latch 402 in the second direction 22 (e.g., against the bias force applied by the biasing member 422) toward a disengaged position as the cover approaches the coupled position, thereby enabling the latch 402 to move relative to the receiver 424.

To couple the cover to the frame 218 of the header, the mounting portion may be engaged with the recess formed by the plate while the latch 402 is positioned above the receiver 424 (e.g., with respect to the vertical axis 14). The cover may then be rotated about the mounting portion/recess, such that the latch 402 moves toward the receiver 424 (e.g., with respect to the vertical axis 14). As the cover approaches the coupled position, the guides 432 direct the pin 406 into the recess 434, and the ramp 436 drives the latch 402 toward the disengaged position. Engagement of the pin 406 with the recess 434 blocks further rotation of the cover/movement of the latch 402 toward the receiver 424 and aligns the pin 406 with the aperture 438. Alignment of the pin 406 with the aperture 438 enables the biasing member 422 to drive the pin 406 into the aperture 438, thereby engaging the latch 402 with the receiver 424. With the pin 406 disposed within the aperture 438, movement of the pin 406 in directions crosswise to the first and second directions (e.g., directions along the longitudinal axis 10 and directions along the vertical axis 14) is blocked, thereby coupling the cover to the frame 218. As a result, the cover is in the coupled position.

Furthermore, to remove the cover from the frame 218 of the header, the operator may move the handle 404 in the second direction 22 (e.g., against the bias force applied by the biasing member 422), thereby driving the pin 406 out of the aperture 438, which moves the latch 402 from the engaged position to the disengaged position. The cover may then be rotated about the mounting portion/recess away from the coupled positioned. The handle 404 may then be released, and the mounting portion may be disengaged from the recess formed by the plate. Accordingly, the latch assembly 400 enables the cover to be removed from the frame 218 and attached to the frame 218 without tools, thereby substantially reducing the duration associated with knife drive cleaning/maintenance operations. As a result, the efficiency of the harvesting process may be enhanced.

While the receiver 424 has two engagement portions in the illustrated embodiment, in other embodiments, the receiver may have more or fewer engagement portions (e.g., 1, 3, 4, or more). For example, in certain embodiments, the first engagement portion may be omitted, or the receiver may include multiple engagement portions having the same configuration as the first engagement portion. Furthermore, while the second engagement portion 430 includes the ramp 436 in the illustrated embodiment, in other embodiments, the ramp may be omitted. In such embodiments, the operator may move the handle in the second direction as the cover approaches the coupled position. In addition, while a single latch/receiver is disclosed above with respect to FIG. 6, in certain embodiments, the latch assembly may include multiple latches and a corresponding number of receivers, such as two latches/receivers, as disclosed above with regard to FIG. 4. In such embodiments, each latch/receiver may have the same structure disclosed herein with respect to FIG. 6, or at least two latches/receivers may have different structures. Furthermore, while the latch assembly 400 is disclosed herein with regard to coupling the cover disclosed with respect to FIGS. 3-5 to the frame of the header, the latch assembly may also be employed to couple another suitable knife drive cover to a frame of a header. In addition, the cover disclosed with respect to FIGS. 3-5 may be coupled to the frame of the header via another suitable type of latch assembly.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cover assembly for a knife drive of an agricultural header, comprising:

a cover having a channel configured to receive a drive arm of the knife drive, wherein the channel faces upwardly with respect to a vertical axis of the agricultural header, and a lateral extent of the channel is configured to enable the drive arm to oscillate to drive a blade support of a cutter bar assembly to oscillate;

wherein the cover has a front section and a rear section, the front section extends upwardly and rearwardly from a front end of the cover to the rear section, the rear section extends continuously downwardly and rearwardly from the front section to a rear end of the cover, and the rear section is configured to be angled less than 45 degrees relative to a longitudinal belt of the agricultural header; and wherein the cover has a lateral concave portion configured to direct crop material from a lateral belt to the longitudinal belt.

2. The cover assembly of claim 1, wherein the front section is convex and has a shape configured to substantially match a shape of a crop deflector of the agricultural header.

3. The cover assembly of claim 1, wherein a portion of the rear section is positioned behind the channel with respect to a longitudinal axis of the agricultural header.

4. The cover assembly of claim 1, wherein the cover has a second lateral concave portion configured to direct the crop material from a second lateral belt to the longitudinal belt, and the second lateral concave portion is positioned on an opposite lateral side of the cover from the lateral concave portion.

5. The cover assembly of claim 1, wherein sidewalls of the channel are angled laterally outwardly from a base surface of the channel.

6. The cover assembly of claim 1, wherein the cover has a second channel configured to receive a second drive arm of the knife drive, the second channel faces upwardly with respect to the vertical axis of the agricultural header, a lateral extent of the second channel is configured to enable the second drive arm to oscillate to drive a second blade support of the cutter bar assembly to oscillate, and the channel and the second channel are spaced apart from one another with respect to a lateral axis of the cover.

7. The cover assembly of claim 1, comprising a latch configured to engage a receiver to couple the cover to a frame of the agricultural header.

8. The cover assembly of claim 7, wherein the latch has a handle positioned within the channel of the cover.

9. The cover assembly of claim 7, comprising a biasing member configured to urge the latch toward an engaged position, wherein the latch is configured to engage the receiver while in the engaged position.

10. An agricultural header, comprising:

a cutter bar assembly comprising a blade support;

a knife drive comprising a drive arm coupled to the blade support, wherein the drive arm is configured to oscillate to drive the blade support to oscillate; and a cover assembly, comprising:

a cover having a channel, wherein the drive arm is positioned within the channel, the channel faces upwardly with respect to a vertical axis of the agricultural header, and a lateral extent of the channel is configured to enable the drive arm to oscillate;

wherein the cover has a front section and a rear section, the front section extends upwardly and rearwardly from a front end of the cover to the rear section, the rear section extends continuously downwardly and rearwardly from the front section to a rear end of the cover, and the rear section is configured to be angled less than 45 degrees relative to a longitudinal belt of the agricultural header; and wherein the cover has a lateral concave portion configured to direct crop material from a lateral belt to the longitudinal belt.

11. The agricultural header of claim 10, wherein the cutter bar assembly comprises a second blade support, the knife drive comprises a second drive arm coupled to the second blade support, the second drive arm is configured to oscillate to drive the second blade support to oscillate, the cover has a second channel, the second drive arm is positioned within the second channel, the second channel faces upwardly with respect to the vertical axis of the agricultural header, a lateral extent of the second channel is configured to enable the second drive arm to oscillate, and the channel and the second channel are spaced apart from one another with respect to a lateral axis of the cover.

12. The agricultural header of claim 10, wherein the front section is convex and has a shape configured to substantially match a shape of a crop deflector of the agricultural header.

13. The agricultural header of claim 10, wherein a portion of the rear section is positioned behind the channel with respect to a longitudinal axis of the agricultural header.

14. The agricultural header of claim 10, comprising a latch assembly, comprising:

a latch movably coupled to the cover; and a receiver configured to couple to a frame of the agricultural header;

wherein the latch is configured to engage the receiver to couple the cover to the frame of the agricultural header.

15. The agricultural header of claim 14, wherein the latch has a handle positioned within the channel of the cover.

16. The agricultural header of claim 10, comprising a plate configured to couple to a frame of the agricultural header, wherein the cover has a mounting portion extending rearwardly from the rear end of the cover, and the plate is configured to form a recess configured to receive the mounting portion of the cover.

17. A cover assembly for a knife drive of an agricultural header, comprising:

a cover having a channel configured to receive a drive arm of the knife drive, wherein the channel faces upwardly with respect to a vertical axis of the agricultural header, and a lateral extent of the channel is configured to enable the drive arm to oscillate to drive a blade support of a cutter bar assembly to oscillate;

wherein the cover has a front section and a rear section, the front section extends upwardly and rearwardly from a front end of the cover to the rear section, the rear section extends continuously downwardly and rearwardly from the front section to a rear end of the cover, and the rear section is configured to be angled less than 45 degrees relative to a longitudinal belt of the agricultural header; and a latch configured to engage a receiver to couple the cover to a frame of the agricultural header, wherein the latch has a handle positioned within the channel of the cover.

18. The cover assembly of claim 17, wherein the cover has a lateral concave portion configured to direct crop material from a lateral belt to the longitudinal belt.

19. The cover assembly of claim 17, wherein the front section is convex and has a shape configured to substantially match a shape of a crop deflector of the agricultural header.

20. The cover assembly of claim 17, wherein a portion of the rear section is positioned behind the channel with respect to a longitudinal axis of the agricultural header.

* * * * *